(12) United States Patent
Moore

(10) Patent No.: US 6,384,973 B1
(45) Date of Patent: May 7, 2002

(54) CONVEX BREWSTER-CUT CRYSTAL FOR NONLINEAR FREQUENCY CONVERSION

(75) Inventor: Gerald T. Moore, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/681,491

(22) Filed: Apr. 17, 2001

(51) Int. Cl.⁷ .............................................. G02B 27/28
(52) U.S. Cl. ...................... 359/496; 359/352; 359/487; 359/495; 359/497
(58) Field of Search ................... 359/496, 495, 359/497, 487, 352

(56) References Cited

U.S. PATENT DOCUMENTS 6,040,942 A * 3/2000 Bergmann .................. 359/487

* cited by examiner

Primary Examiner—Audrey Chang
Assistant Examiner—Craig Curtis
(74) Attorney, Agent, or Firm—James M. Skorich; Kenneth E. Callahan

(57) ABSTRACT

A specially cut uncoated birefringent crystal having three Brewster-cut faces with adjacent coated Brewster-cut coupling prisms for optical frequency conversion. Two IR input frequencies are used to obtain a third visible light frequency by sum-frequency generation. The uncoated birefringent crystal permits high power input beams. The two Z-polarized IR beams enter the lower portion of the Brewster cut IR input end of the crystal and pass out the Brewster cut lower portion of the output end, generating a Y-polarized visible light beam. The visible wavelength beam is reflected at the Brewster cut Z-polarized surface at the output end and again reflected at the upper output end surface cut perpendicular to the Brewster cut. The visible beam travels back toward the IR input end near the top surface of the crystal and exits through an upper Brewster cut surface cut for Y-polarized light. Input and output prisms with appropriate optical coatings are used to facilitate the process.

2 Claims, 3 Drawing Sheets

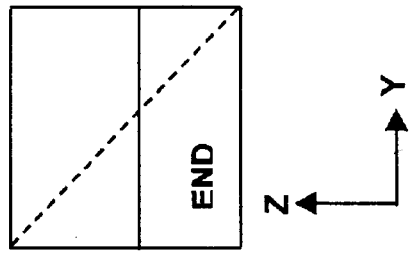
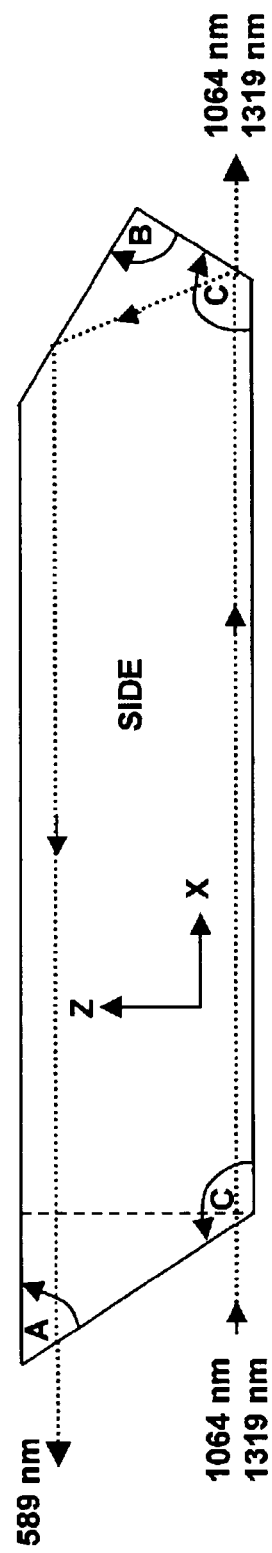
FIG. 3A
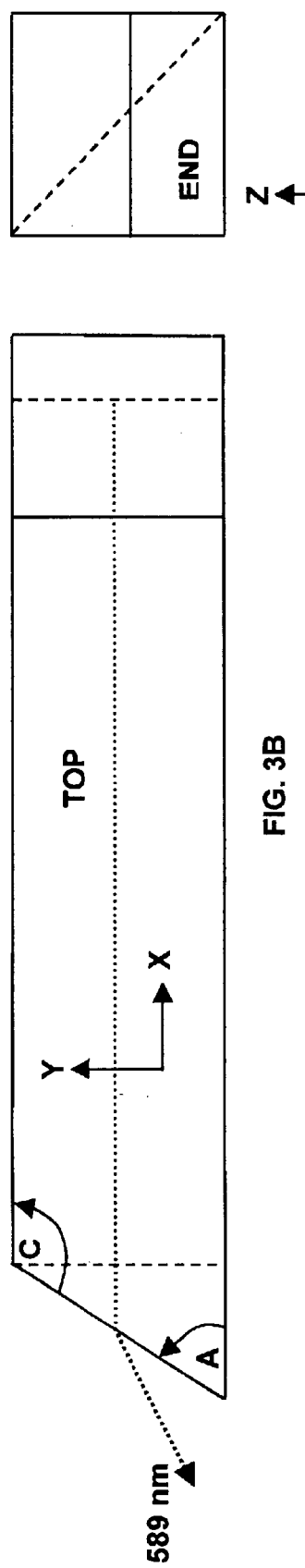
FIG. 3B
FIG. 3C

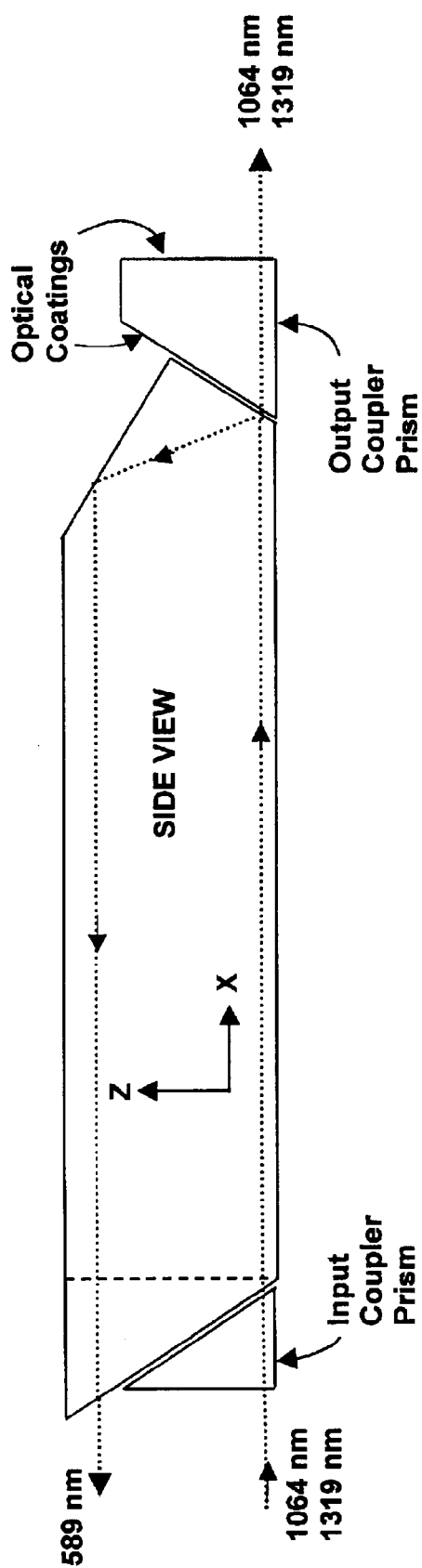

CONVEX BREWSTER-CUT CRYSTAL FOR NONLINEAR FREQUENCY CONVERSION

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

The present invention is in the field of optical frequency conversion using birefringent nonlinear crystals, and in particular, relates to using an uncoated, specially cut lithium triborate (LBO) crystal.

Lasers operating in the infrared band are fairly common. Lasers in the visible light band are more difficult to produce and frequently involve the up conversion of lower frequency lasers by various nonlinear optical effects. Phase matching in birefringent nonlinear crystals used for optical frequency conversion generally requires a nonlinear interaction between three linearly polarized optical beams propagating in the same direction, but with one of the beams polarized orthogonally to the other two. Usually anti-reflection (AR) coatings are applied to the entrance and exit faces of the crystal, though it can be difficult or impossible to obtain ideal AR coatings for three wavelengths. These optical coatings on nonlinear crystals, however, can be an impediment to using them as frequency-conversion devices at high average power. For example, absorption by coatings on the biaxial crystal lithium triborate (LBO) causes local heating of both the coating and the crystal. Because LBO is extremely transparent at near-infrared and visible wavelengths, coating absorption can be larger than absorption in the bulk crystal. This heating, because of the large and anisotropic thermal expansion of LBO, may cause coatings to buckle or loosen.

From the foregoing it is apparent that there is a need for a frequency conversion means using birefringent crystals that does not involve optical coatings on the crystal faces that have the potential to overheat during high average power operation.

SUMMARY OF INVENTION

In a preferred embodiment, the present invention uses Brewster-cut uncoated planar surfaces on a specially cut birefringent crystal to obtain a third higher frequency by sum-frequency generation from a two-frequency input. The intersections of this specially cut nonlinear crystal are all convex, thereby greatly simplifying the required cutting and polishing.

The specially cut uncoated birefringent crystal has a primary optical axis along the X direction. Two different infrared wavelengths polarized along the Z-axis and traveling along the +X axis combine within the birefringent crystal by the sum-frequency process to generate a third, visible wavelength polarized along the Y-axis. The infrared input end has two surfaces: a lower triangular-shaped Brewster surface cut for Z-polarization transmission to pass the infrared input wavelengths and an upper inverted triangular-shaped Brewster surface cut for Y-polarization transmission. The infrared output end has a lower Brewster surface cut for Z-polarization transmission to pass the infrared wavelengths out of the crystal and an upper surface cut perpendicular to the lower surface. It is designed to reflect the Y-polarized visible light back along the −X direction in the upper portion of the crystal. An output coupler prism having an input Brewster surface cut for Z-polarization transmission is located adjacent to the Brewster cut surface at the infrared output end. This prism's Brewster surface has anti-reflection coatings matched to the infrared input wavelengths and a high-reflection coating matched to the visible wavelength to pass the infrared and reflect the visible light. The visible wavelength traveling along the upper portion of the crystal in the −X direction passes out of the crystal at the upper Brewster surface cut for Y-polarization transmission.

Other aspects and advantages of the present invention will become apparent from the following detailed description, taken in conjunction with the accompanying drawings, illustrating by way of example the principles of the invention.

BRIEF DESCRIPTION OF DRAWINGS

The present invention will be described with reference to the accompanying drawings.

FIG. 3A is a side view of the specially cut birefringent crystal.

FIG. 3B is a top view of the specially cut birefringent crystal.

FIG. 3C is an end view of the specially cut birefringent crystal.

FIG. 4 is a side view of the birefringent crystal with the input and output coupling prisms.

DETAILED DESCRIPTION

A birefringent crystal with specially cut input and output surfaces can be used to generate visible light laser radiation by the sum-frequency process using two lower frequency (infrared) laser beams. This crystal does not require optical coatings on its input and output surfaces, and so avoids the heating problems associated with these coatings during high power operations.

Birefringent crystals can be used in many frequency-conversion applications, including second-harmonic generation and optical parametric oscillation. However, only the exemplary specific case of sum-frequency generation using two infrared (IR) wavelength laser beams to generate a visible wavelength laser beam is discussed in detail. Specifically, IR wavelengths $\lambda_1$=1064-nm and $\lambda_2$=1319-nm combine in the birefringent crystal to generate $\lambda_3$=589-nm, in a LBO crystal, This interaction can be phase matched for propagation in the X direction by temperature tuning the crystal. The two IR light beams are polarized in the Z direction, and the 589-nm yellow light is polarized in the Y direction.

Figure 1:
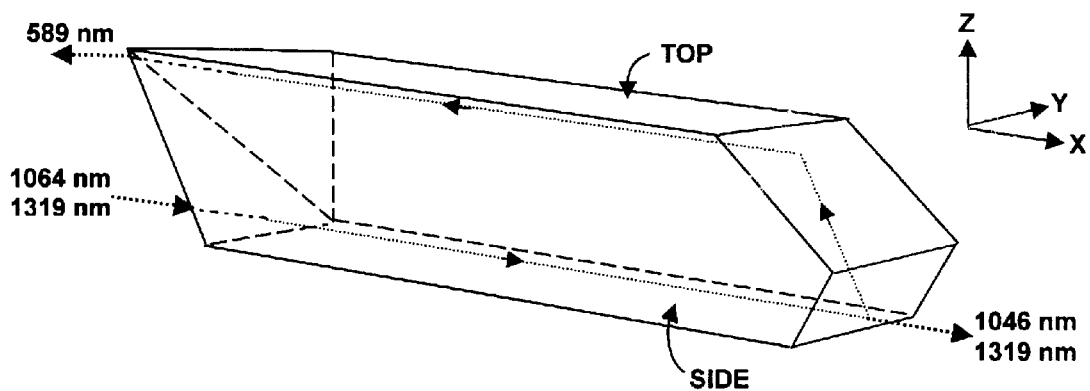
FIG. 1 is a perspective view of the specially cut birefringent crystal and output prism configuration from the vicinity of the output end.
Figure 2:
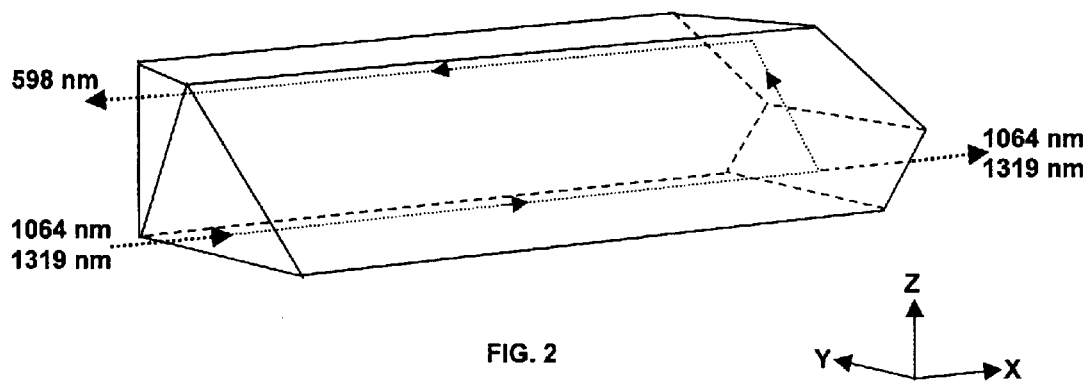
FIG. 2 is a perspective view of the specially cut birefringent crystal and output prism configuration from the vicinity of the input end.

FIG. 1 and FIG. 2 show two perspective views of the uncoated LBO crystal. FIG. 3 gives side (3A), top (3B), and end (3C) views of this crystal with the angles indicated for the LBO crystal with an index of refraction of about 1.6. The LBO crystal has three surfaces oriented at the Brewster angle (in this case 58 degrees). Two are designed to pass the Z-polarized IR wavelengths and the third passes the Y-polarized visible light. The glass input and output prisms are shown in FIG. 4. This figure illustrates the case where the index of refraction of the prisms is approximately equal to that of LBO. When this is not the case, the angles of the prism faces not adjacent to the crystal can nevertheless be selected so that the external direction of propagation remains the same as that in the LBO, though the light is then not normally incident on these faces. The two prisms serve to maintain directions and circular transverse profiles of the beams. The crystal and prisms can be kept in alignment by inserting them into a machined fixture (not shown) which could be constructed as part of the oven needed for controlling the crystal temperature.

An input coupler prism (for the case of equal glass and crystal refractive indices) has its input face normal to the two incoming IR beams. This normal face is coated with anti-reflection (AR) coatings matched to these incoming beams. The output face of the input prism is Brewster cut such that the IR beams, polarized along the Z-axis, pass through the input coupler prism. The Brewster cut face of the prism is adjacent to the Z-polarized Brewster cut surface of the crystal input end. The height of this prism should be made small enough so as to not obscure the 589-nm beam exiting from the top of the crystal through its Y-polarized Brewster cut surface.

A glass output prism is used to couple IR beams out of the crystal. It has a Brewster cut face that is positioned adjacent to the Brewster cut face of the output end of the LBO crystal. This surface of the prism is coated to reflect $\lambda_3$ while transmitting $\lambda_1$ and $\lambda_2$, and this coated surface is butted against the Brewster cut face of the output end of the LBO crystal to minimize etalon effects on the reflected $\lambda_3$ beam. The prism's normal face is coated to transmit the IR wavelengths.

The two Z-polarized IR laser beams enter the crystal at the lower portion of the input side. The triangular-shaped IR input face is Brewster cut to transmit Z-polarized radiation. The nonlinear interaction between these two input wavelengths $(\lambda_1,\lambda_2)$ within the birefringent crystal generates a third wavelength $\lambda_3$ by the sum-frequency process. The $\lambda_3$ beam has orthogonal polarization along the Y-axis. Its wavelength is shorter than either of the input wavelengths and is calculated from:

$$1/\lambda_1+1/\lambda_2=1/\lambda_3.$$

The IR beams travel along the X principal crystal axis to the output end of the birefringent crystal cut at the Brewster angle so that they pass through and out of the birefringent crystal. This same face, however, partially reflects the orthogonally polarized $\lambda_3$ beam. The output coupler prism further reflects the Y-polarized $\lambda_3$ beam and passes the IR beams out of the crystal. The $\lambda_3$ beam then is reflected by both the Brewster-cut output end of the birefringent crystal and the Brewster-cut input end of the output coupler prism. It is reflected toward the second surface at the output end that is cut orthogonal to the Brewster cut. This surface totally internally reflects $\lambda_3$ back along the –X axis and out the Y-polarized Brewster cut surface at the IR input end of the crystal. It travels parallel to and close to the top crystal surface. The inverted triangular-shaped third Brewster cut face is designed to transmit Y-polarized light and so passes the $\lambda_3$ beam out of the crystal. This beam is refracted toward the Y-axis by about 26 degrees with respect to the –X direction. A prism to restore the beam to the –X propagation direction and to a round irradiance profile can be inserted at any convenient distance from the crystal.

It is conceptually simplest, but not essential, that the prism glass have an index of refraction nearly equal to that of the crystal (about 1.6 for LBO). If this is not the case, appropriately tipping the coated prism faces which are not adjacent to the prism away from normal incidence can prevent beam deflection and allow the beam profiles to be circular both in free space and inside the crystal.

While tunability may be improved by using different coatings over different wavelength ranges, the coated elements are inexpensive glass, rather than an expensive specially cut crystal. The technique described here can also be used with other kinds of crystals. An example is lithium niobate, which can be non-critically phase-matched orthogonally to its optical axis for some choices of wavelength. However, it is more difficult to prevent beam deflection by using prisms when a crystal of high refractive index, such as lithium niobate, is used.

I claim:

1. An apparatus for optical frequency conversion using a specially cut uncoated birefringent crystal with a primary optical axis along the X direction wherein a first infrared input wavelength and a second infrared input wavelength polarized along the Z axis combine within the birefringent crystal by the sum-frequency process to generate a third, visible wavelength polarized along the Y axis, said apparatus comprised of:

a birefringent crystal having an infrared input end comprised of a first lower triangular-shaped Brewster cut surface cut for Z-polarization transmission and a first upper inverted triangular-shaped Brewster cut surface cut for Y-polarization transmission and an infrared output end comprised of a second lower Brewster cut surface cut for Z-polarization transmission and a second upper surface cut perpendicular to the second lower Brewster cut surface;

an input coupler prism having a normal input face with anti-reflection coatings for the IR wavelengths and a Brewster cut output face cut for Z-polarized wavelengths positioned adjacent to the birefringent crystal first lower Brewster cut surface; and an output coupler prism having an input Brewster surface cut for Z-polarization transmission and anti-reflection coatings matched to the infrared input wavelengths and a high-reflection coating matched to the visible wavelength and positioned adjacent to the second lower Brewster cut surface, and having an anti-reflection coated output face, whereby the infrared wavelengths pass into and out of the lower part of the birefringent crystal along the X-axis and generate the visible wavelength by the sum-frequency process, which visible wavelength is reflected at the second lower Brewster cut surface and at the second upper surface and passes out of the birefringent crystal at the first upper Brewster cut surface.

2. The birefringent crystal apparatus of claim 1, wherein said birefringent crystal is composed of lithium triborate (LBO).

* * * * *